US012743478B2

(12) United States Patent
Ramasamy et al.

(10) Patent No.: US 12,743,478 B2
(45) Date of Patent: Sep. 22, 2026

(54) MANAGING PROGRESSIVE WEB APPLICATIONS

(71) Applicant: Dell Products L.P., Round Rock, TX (US)

(72) Inventors: Sudhakar Ramasamy, Salem (IN); Gokul Thiruchengode Vajravel, Bangalore (IN); Jyothi Bandakka Nanjappa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/671,717

(22) Filed: May 22, 2024

(65) Prior Publication Data

US 2025/0363182 A1 Nov. 27, 2025

(51) Int. Cl.
*G06F 16/958* (2019.01)
*G06F 8/61* (2018.01)
*G06F 21/60* (2013.01)

(52) U.S. Cl.
CPC .............. *G06F 16/958* (2019.01); *G06F 8/61* (2013.01); *G06F 21/602* (2013.01)

(58) Field of Classification Search
CPC ................................. G06F 16/958; G06F 8/61
See application file for complete search history.

(56) References Cited

U.S. PATENT DOCUMENTS 8,365,164 B1 * 1/2013 Morgenstern ....... G06F 9/44552 717/175
2006/0200565 A1 * 9/2006 Ng .......................... G06F 9/541 709/227
2019/0251198 A1 * 8/2019 Shamsutdinov ...... G06F 21/602
2020/0110592 A1 * 4/2020 Straub ....................... G06F 8/64
2021/0182729 A1 * 6/2021 George .................. G06N 20/00
(Continued)

FOREIGN PATENT DOCUMENTS

CN 111026413 A * 4/2020 ............... G06F 8/10

OTHER PUBLICATIONS

Michael Perrigo, "Desktop users have installed Progressive Web Apps 270% more over the past year.", (url: https://chromeunboxed.com/desktop-pwa-install-growth-2022-yoy) Mar. 1, 2022; 5 pages.
(Continued)

*Primary Examiner* — David R Lazaro
*Assistant Examiner* — Mariegeorges A Henry
(74) *Attorney, Agent, or Firm* — McDermott Will & Schulte LLP

(57) ABSTRACT

Managing progressive web applications, including: identifying parameters associated with a progressive web application (PWA), the parameters including a uniform resource locator (URL) associated with the PWA; identifying, based on the parameters associated with the PWA, a manifest file corresponding to the URL; parsing the manifest file to retrieve metadata of the manifest; creating a configuration file for the PWA based on the metadata; identifying a particular application wrapper template based on an operating system for the PWA; injecting the configuration file into the application wrapper template; creating an installation package including the injected application wrapper template; and code-signing the installation package with a certificate.

15 Claims, 5 Drawing Sheets

(56) References Cited

U.S. PATENT DOCUMENTS

| | | | | |
|---|---|---|---|---|
| 2023/0012013 | A1* | 1/2023 | Livshin | H04L 9/3252 |
| 2023/0052991 | A1* | 2/2023 | Ricklis | G06F 16/958 |

OTHER PUBLICATIONS

Progressive Web Apps, (url: https://web.dev/learn/pwa/progressive-web-apps/#bringing-the-best-of-both-worlds) Nov. 3, 2021; 8 pages.
pwabuilder-Win32, (url: https://www.npmjs.com/package/pwabuilder-win32) Apr. 21, 2017; 5 pages.
Progressive Web Apps, (url: https://web.dev/learn/pwa/progressive-web-apps) Nov. 3, 2021; 8 pages.
Introduction to Microsoft Edge WebView2, (url: https://learn.microsoft.com/en-us/microsoft-edge/webview2/) Jun. 20, 2024; 4 pages.
WkWebView, (url: https://developer.apple.com/documentation/webkit/wkwebview) viewed Aug. 28, 2024; 12 pages.
WebKitGTK, (url: https://webkitgtk.org/) viewed Aug. 28, 2024; 2 pages.
Automatically install web apps, (url: https://support.google.com/chrome/a/answer/9367354?hl=en) viewed Aug. 28, 2024; 2 pages.
Software Restriction Policies, (url: https://learn.microsoft.com/en-us/windows-server/identity/software-restriction-policies/software-restriction-policies) Jan. 16, 2023; 3 pages.
Dell Update Packages version 22.01.00.00 User's Guide, (url: https://www.dell.com/support/manuals/en-us/dell-update-packages/dupframework_22.01.00/supported-operating-systems?guid=guid-5cd83b00-cf2b-479e-bcb8-bfa7cc6c2c2a&lang=en-us) Oct. 2023; 43 pages.
Progressive Web Apps, (url: https://pamp.rocks/) viewed Aug. 28, 2024; 8 pages.
Own your data, all of it., (url: https://0data.app/) viewed Aug. 28, 2024; 5 pages.
Awesome-pwa, (url: https://github.com/hemanth/awesome-pwa#apps) viewed Aug. 28, 2024 ; 12 pages.
PWA List, (url: https://www.pwalist.app/) viewed Aug. 28, 2024; 1 page.
Appscope, (url: https://appsco.pe/) vieweed Aug. 28, 2024; 2 pages.

* cited by examiner 200
206
Manifest File 264
PWA Management Computing Module 210
Configuration File 266
Policy 272
PWA Parameters 262
Application Wrapper Template 268
Installation Package 270
Data store 212
Information Handling System 202
Agent Computing Module 299
Client Information Handling System 204
252
250

MANAGING PROGRESSIVE WEB APPLICATIONS

BACKGROUND

Field of the Disclosure

The disclosure relates generally to an information handling system, and in particular, managing progressive web applications at information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Progressive Web Apps (PWAs) are browser-based websites that emulate the appearance, functionality, and features of native mobile apps. They reside within the browser like regular websites but can be launched from a home screen icon, load instantly, and function offline.

SUMMARY

Innovative aspects of the subject matter described in this specification may be embodied in a method of managing progressive web applications, including identifying parameters associated with a progressive web application (PWA), the parameters including a uniform resource locator (URL) associated with the PWA; identifying, based on the parameters associated with the PWA, a manifest file corresponding to the URL; parsing the manifest file to retrieve metadata of the manifest; creating a configuration file for the PWA based on the metadata; identifying a particular application wrapper template based on an operating system for the PWA; injecting the configuration file into the application wrapper template; creating an installation package including the injected application wrapper template; and code-signing the installation package with a certificate.

Other embodiments of these aspects include corresponding systems, apparatus, and computer programs, configured to perform the actions of the methods, encoded on computer storage devices.

These and other embodiments may each optionally include one or more of the following features. For instance, the parameters associated with the PWA include a platform and the operating system. The metadata of the manifest includes application name, version, description, and icon associated with the PWA. Uploading the installation package to a data store. Updating an application catalog listing based on the installation package. Creating an application policy based on the installation package of the application catalog listing. Applying the application policy at a client information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
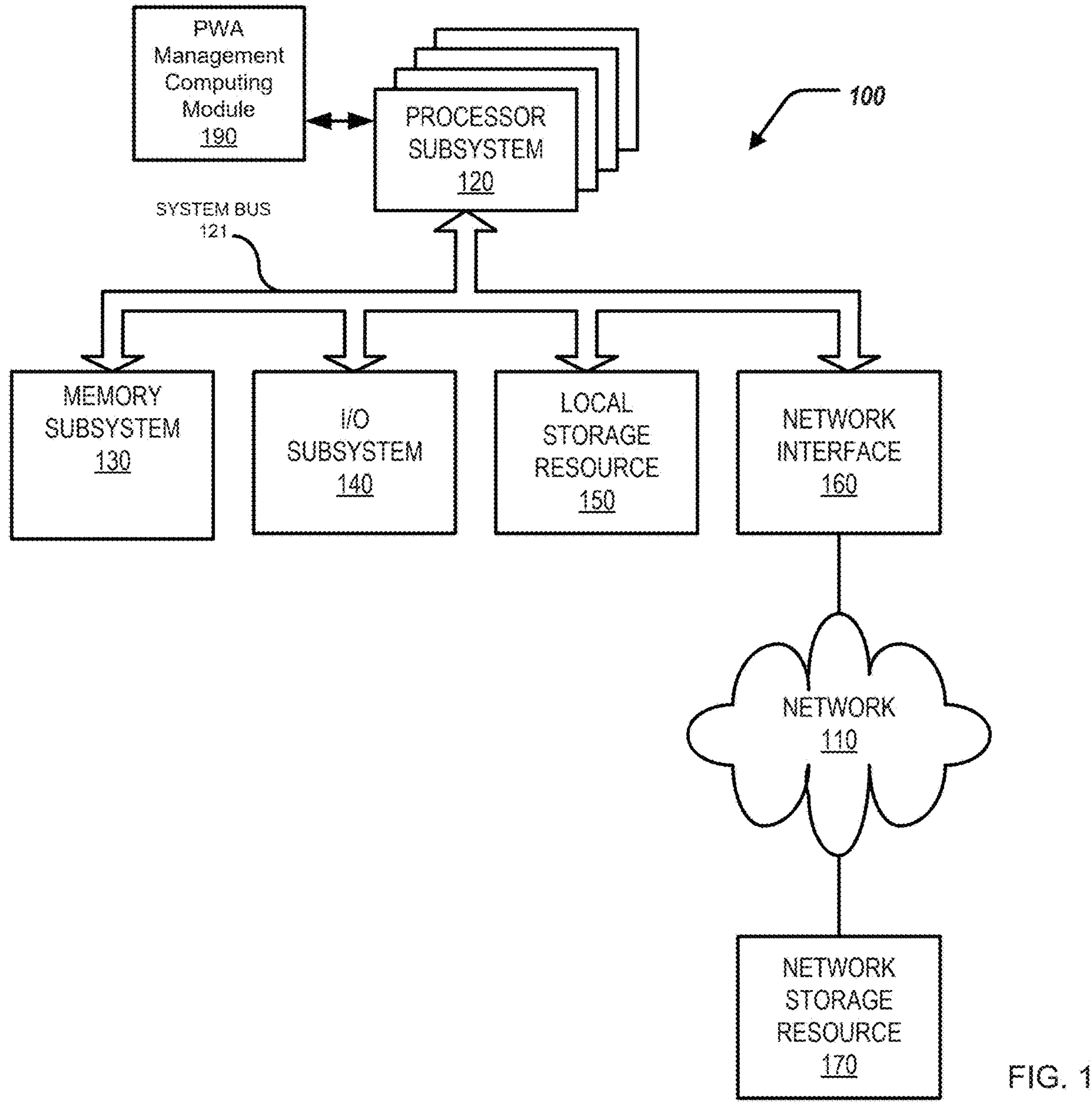
FIG. 1 is a block diagram of selected elements of an embodiment of an information handling system.

This disclosure discusses methods and systems for managing progressive web applications. In short, a progressive web application (PWA) can be implemented by creating a native application wrapper that leverages system webview APIs that are available at the devices based on the operating system to render the PWA. Existing management suits can be enabled to manage PWA deployment security in the same way as native application deployments. The PWAs are agnostic to the information handling system, operating system, and browser types. Further, the PWA deployment can adhere to security policies of app-deployment such as code-signing, integrity verification, restriction deployment by cert/vendor/version, and the like.

Specifically, this disclosure discusses a system and a method for managing progressive web applications, including identifying parameters associated with a progressive web application (PWA), the parameters including a uniform resource locator (URL) associated with the PWA; identifying, based on the parameters associated with the PWA, a manifest file corresponding to the URL; parsing the manifest file to retrieve metadata of the manifest; creating a configuration file for the PWA based on the metadata; identifying a particular application wrapper template based on an operating system for the PWA; injecting the configuration file into the application wrapper template; creating an installation package including the injected application wrapper template; and code-signing the installation package with a certificate.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mounted display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a progressive web application (PWA) management computing module 190. The PWA management computing module 190 can be in communication with the processor subsystem 120, or included by the processor subsystem 120. In some examples, the PWA management computing module 190 is included by an embedded controller (EC) of the information handling system 100. In some examples, the PWA management computing module 190 is included by baseband management controller of the information handling system 100.

Figure 2:
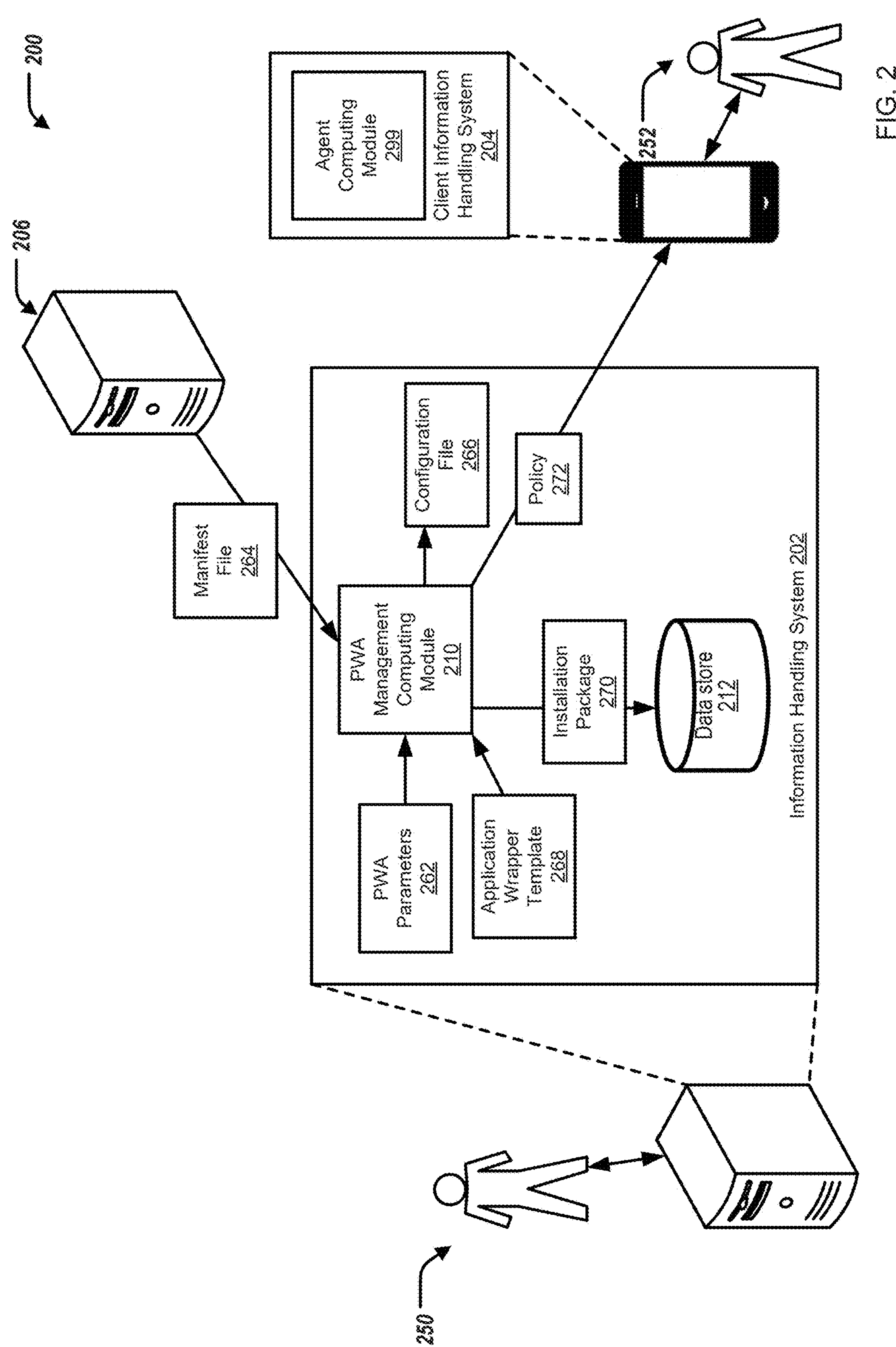
FIG. 2 illustrates a block diagram of an information handling system for managing progressive web applications.

Turning to FIG. 2, FIG. 2 illustrates an environment 200 including an information handling system 202, a client information handling system 204, and a web server information handling system 206. The information handling system 202 can include a PWA management computing module 210 and a data store 212. In some examples, the information handling system 202 is similar to, or includes, the information handling system 100 of FIG. 1. In some examples, the PWA management computing module 210 is the same, or substantially the same, as the PWA management computing module 190 of FIG. 1.

The client information handling system 202 can include an agent computing module 299. In some examples, the client information handling system 204 is similar to, or includes, the information handling system 100 of FIG. 1.

The information handling system 202 can be in communication with the client information handling system 204 and the web server information handling system 206 (e.g., over a network, the "Internet.")

In short, a progressive web application (PWA) can be implemented by creating a native application wrapper that leverages system webview APIs that are available at the devices based on the operating system to render the PWA. The PWA management computing module 210 can enable existing management suits and PWAs to manage PWA deployment security in the same way as native application deployments. The PWAs are agnostic to the information handling system, operating system, and browser types. Further, the PWA deployment can adhere to security policies of app-deployment such as code-signing, integrity verification, restriction deployment by cert/vendor/version, and the like.

Figure 3:
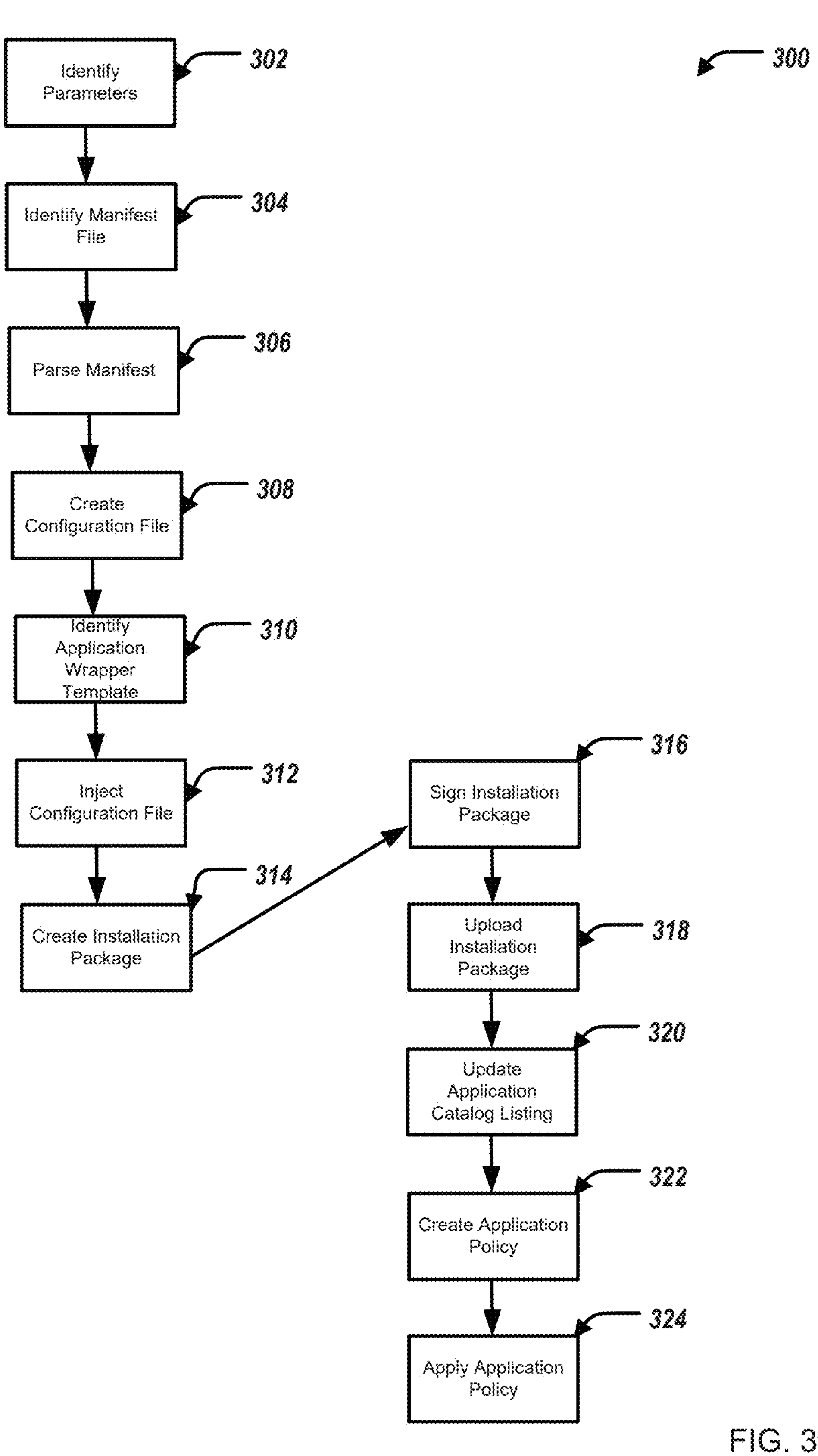
FIG. 3 illustrates a method for managing progressive web applications.

FIG. 3 illustrates a flowchart depicting selected elements of an embodiment of a method 300 for managing progressive web applications. The method 300 may be performed by the information handling system 100, the information handling system 202 and/or the PWA management computing module 210, and with reference to FIGS. 1-2. It is noted that certain operations described in method 300 may be optional or may be rearranged in different embodiments.

The PWA management computing module 210 identifies parameters 262 associated with a progressive web application (PWA), at 302. Specifically, a user 250 (e.g., information technology decision maker (ITDM)) can provide input at the information handling system 202 indicating deployment of the PWA. The information handling system 202 can facilitate triggering of creation of a new package for such PWA deployment (e.g., via a CMS or WMS). The user 250 can provide input at the information handling system 202 further selecting a PWA type option, web application URLs, required platforms (types of information handling systems and OS), and installer types.

In some examples, the parameters 262 associated with the PWA include a uniform resource locator (URL), a platform, and operating system (OS). The URL associated with the PWA can indicate a location of data associated with the PWA and implementation details; the platform can indicate a computing platform type and associated computing parameters associated with the PWA (such as Internet browser); and the OS can indicate an OS type associated with the PWA.

The PWA management computing module 210 identifies, based on the parameters 262 associated with the PWA, a manifest file 264 corresponding to the URL, at 304. Specifically, the PWA management computing module 210 identifies the web server information handling system 206 that is associated with the URL. The web server information handling system 206 provides the manifest file 264 to the PWA management computing module 210. That is, the PWA management computing module 210 fetches the manifest file 264 (manifest.json). In some examples, when the parameters 262 indicate that the browser is of a first type (e.g., a browser other than the Google Chrome browser), the package type (installer type) will be OS specific (e.g., MSIX for Windows, DEB for Linx). In some examples, when the parameters 262 indicate that the browser is of a second type (e.g., the Google Chrome browser), the PWA is installed using known methods provided by the Google Chrome browser.

The PWA management computing module 210 parses the manifest file 264 to retrieve metadata of the manifest file 264, at 306. Specifically, the PWA management computing module 210 parses the manifest file 264 to retrieve metadata including application name, version, description, icon, and the like. The PWA management computing module 210 creates a configuration file 266 for the PWA based on the metadata, at 308. Specifically, the PWA management computing module 210 creates the configuration file 266 (e.g., config.json) for the PWA with the metadata. The PWA management computing module 210 identifies a particular application wrapper template 268 based on the OS for the PWA, at 310. Specifically, the PWA management computing module 210 triggers the build for an installation package associated with the PWA based on the computing platform with the configuration file 266, the required computing platform types, and the OS (e.g., Windows, Ubuntu). The PWA management computing module 210 fetches the particular application wrapper template 268 (from a plurality of application wrapper templates).

The PWA management computing module 210 injects the configuration file 266 into the application wrapper template 268, at 312. Specifically, the PWA management computing module 210 fetches the application wrapper template 268 and injects the configuration file 266 (e.g., config.json) and triggers the installer generation. The PWA management computing module 210 creates the installation package 270 including the injected application wrapper template, at 314. That is, the PWA management computing module 210 creates the installation package 270 based on the configuration file 266. The PWA management computing module 210 code-signs the installation package 270 with a certificate, at 316. The PWA management computing module 210 uploads the installation package 270 to the data store 312, at 318. In some examples, the PWA management computing module 210 further uploads the installation package 270 to a cloud-based data store. The PWA management computing module 210 updates an application catalog listing based on the installation package 270, at 320. Specifically, the PWA management computing module 210 updates the application catalog listing that is stored at the data store 312.

The PWA management computing module 210 creates an application policy 272 based on the installation package 270 of the application catalog listing, at 322. For example, the user 250 can instruct the PWA management computing module 210 to create the application policy 272 with the installation package 270. The PWA management computing module 210 applies the application policy 272 at the client information handling system 204, at 324. Specifically, the user 250 can instruct the PWA management computing module 210 to schedule the application policy 272 to be pushed to the client information handling system 204. The agent computing module 299 applies the application policy 272 at the client information handling system 202. The PWA is available then for usage at the information handling system 202. The user 252 can then engage with the client information handling system 204 to interact with the PWA at the client information handling system 204.

In a use case, the PWA can be securely installed/uninstalled at the client information handling system 202 such that existing IT management solutions can be utilized. In a use case, the PWA can be deployed and managed across all Internet browsers such that custom wrappers or packages for every different browser and OS are not needed. In a use case, the PWA can replace a native application at the client information handling system 202 without affecting user experience such that the PWA can be managed uniformly across devices and OS.

Figure 4:
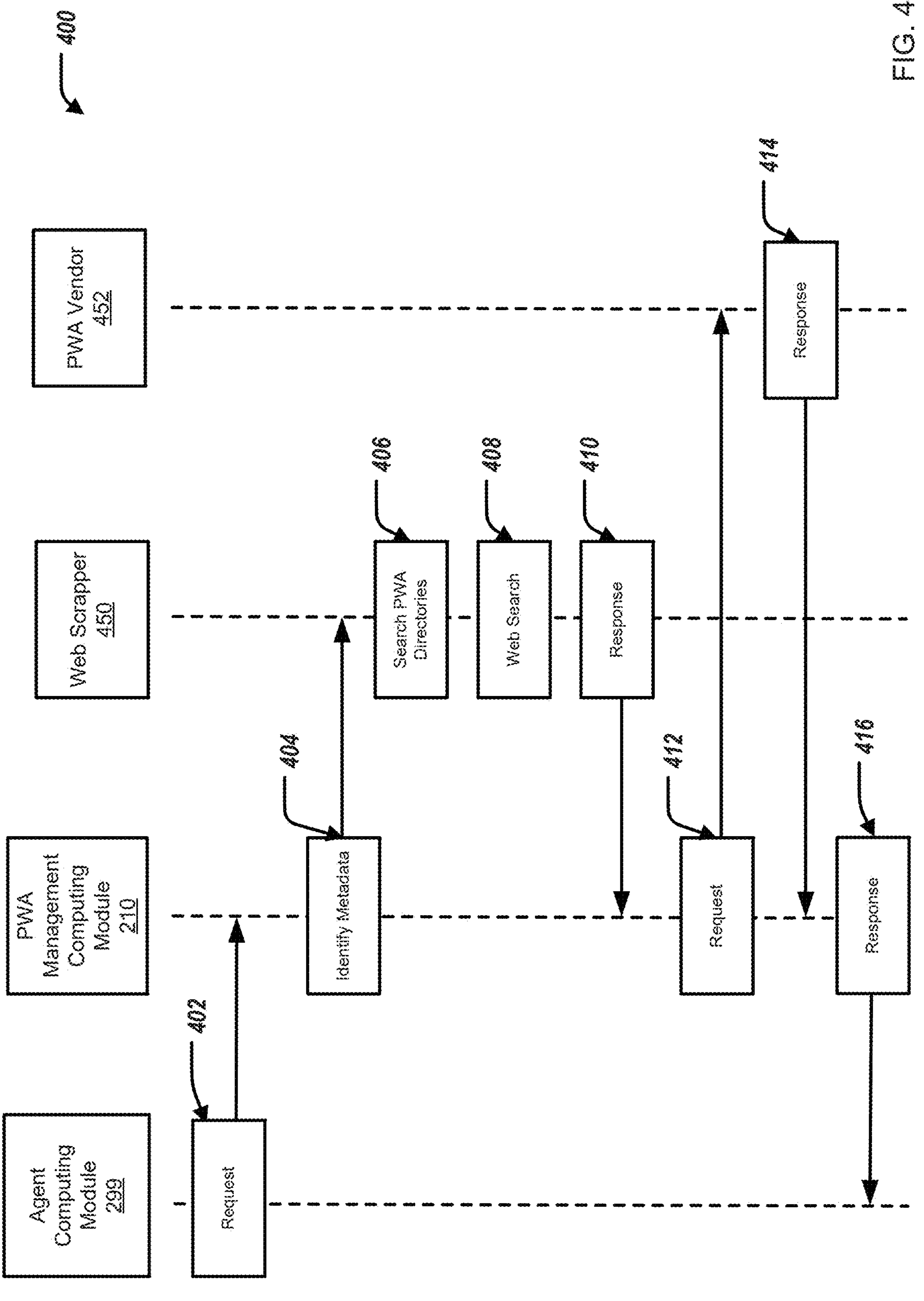
FIG. 4 illustrates a swim-lane diagram for managing progressive web applications.

FIG. 4 illustrates a swim-lane diagram depicting selected elements of an embodiment of a method 400 for managing progressive web applications. The method 400 may be performed by the information handling system 100, the information handling system 202 and/or the PWA management computing module 210, and with reference to FIGS. 1-2. It is noted that certain operations described in method 400 may be optional or may be rearranged in different embodiments.

The user 250 (e.g., ITDM or end user) can provide user input, at the information handling system 202, indicating a request to locate a PWA equivalent of a native application. The agent computing module 299 can provide the request to the management computing module 210, at 402. The PWA management computing module 210 obtains metadata of the native application, at 404. For example, the metadata can include vendor name, application name, website, and the like of the installed application at the client information handling system 202. The PWA management computing module 210 can provide the request (to locate the PWA equivalent of the native application) and associated metadata of the native application to a web scrapper 450, at 406. The web scrapper 450 can be in communication with the information handling system 202. The web scrapper 450 is capable of searching URLs of directories. The web scrapper 450 searches "well-known" PWA directories to locate available PWAs from the metadata of the native application, at 406. If the web scrapper 450 is unable to locate the PWA, the web scrapper 450 performs a web search to scrape data, at 408. The web scrapper 450 provides data indicating the results of the search (e.g., the PWA URL) to the PWA management computing module 210, at 410. The PWA management computing module 210 utilizes the response data and provides a request (http web request) to a PWA vendor 452 for fetching the manifest file (manifest.json information), at 412. The PWA vendor 452 parses the manifest fetch request, and the relevant data is captured and sent to the PWA management computing module 210, at 414. The PWA management computing module 210 forwards relevant data to the client computing device 204, at 416.

Figure 5:
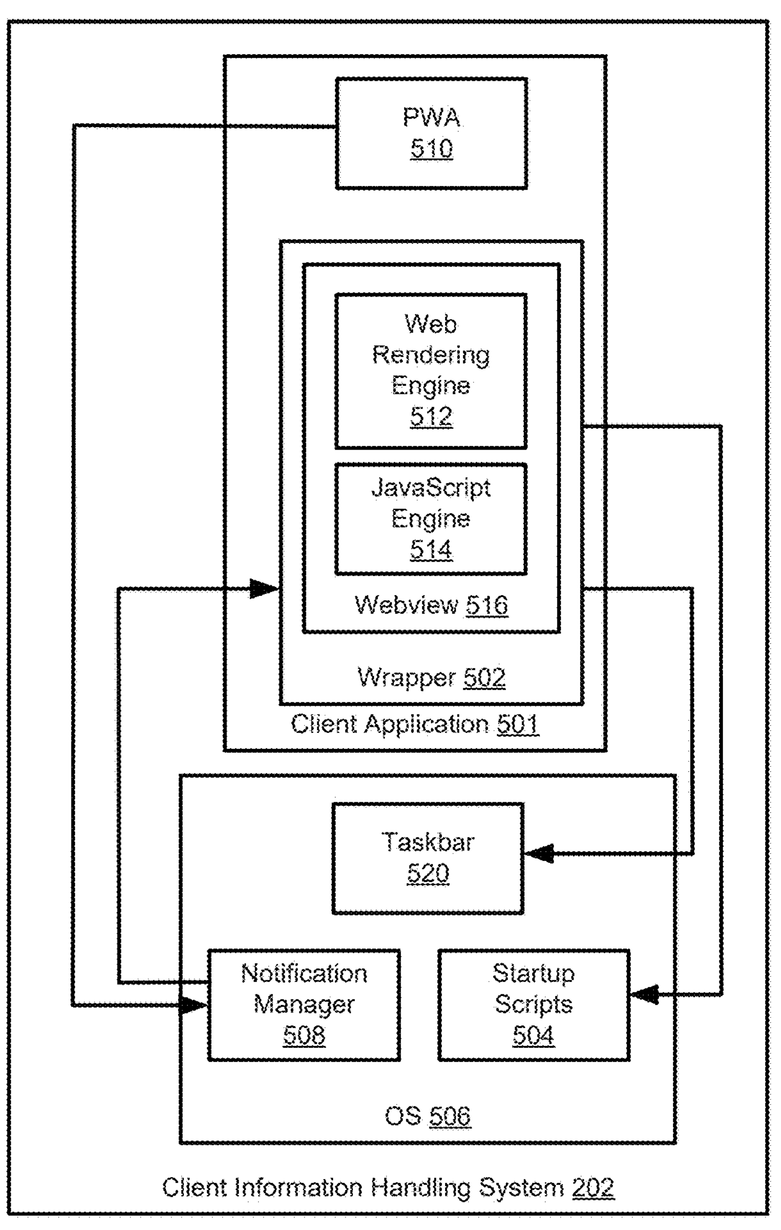
FIG. 5 illustrates a block diagram of a client information handling system.

Turning to FIG. 5, FIG. 5 illustrates the client information handling system 204. A native wrapper client 502 of the client information handling system 202 can add to the startup scripts 504 of the OS 506 (post login) if configured. The run-on startup configuration can be fetched and stored in the config.json. The native wrapper client 502 can parse and place the required entry into the startup scripts 504. The native wrapper client 502 can subscribe to notifications from the notification manager 508 of the OS 506, and the PWA 510 can provide the push notifications using Service Worker to the notification manger 508. That is, for example, the PWA 410 is capable of sending push notifications with Service Worker, and the native wrapper client can listen to the notifications and add badges to the taskbar app icon to improve user experience. Furthermore, features like taskbar jump lists, and multi-instance can also be supported (even on unsupported devices). In short, the native wrapper client 502 provides a secure isolation to the PWA 510, with the containerization technologies available for the native application that can also be directly applied to the PWA 510 for improved security.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing progressive web applications, including:

providing a request for a progressive web application (PWA) to a web scrapper, the request including metadata of a native application associated with the PWA;

searching, by the web scraper, a first set of PWA directories based on the metadata of the native application;

the web scraper unable to locate the PWA in the first set of PWA directions, and in response, searching, by the web scraper, a web search based on the metadata of the native application;

providing, by the web scraper, data indicating results of the web search, including a uniform resource locator (URL) of the PWA;

identifying parameters associated with the PWA, the parameters including the associated with the PWA;

identifying, based on the parameters associated with the PWA, a manifest file corresponding to the URL;

parsing the manifest file to retrieve metadata of the manifest;

creating a configuration file for the PWA based on the metadata;

identifying a particular application wrapper template based on an operating system for the PWA;

injecting the configuration file into the application wrapper template;

creating, by a management computing module at a central information handling system, an installation package including the injected application wrapper template;

code-signing the installation package with a certificate;

creating an application policy based on the installation package;

pushing, by the management computing module at the central information handling system, the application policy to a client information handling system in communication with the central information handling system over a network; and applying the application policy at the client information handling system, including the injected wrapper template associated with the PWA updating notification settings at a taskbar interface at the client information handling system.

2. The computer-implemented method of claim 1, wherein the parameters associated with the PWA include a platform and the operating system.

3. The computer-implemented method of claim 1, wherein the metadata of the manifest includes application name, version, description, and icon associated with the PWA.

4. The computer-implemented method of claim 1, further including uploading the installation package to a data store.

5. The computer-implemented method of claim 4, further including updating an application catalog listing based on the installation package.

6. A computing environment, comprising:

a central information handling system comprising a processor having access to memory media storing instructions executable by the processor to perform operations, comprising:

providing a request for a progressive web application (PWA) to a web scrapper, the request including metadata of a native application associated with the PWA;

searching, by the web scraper, a first set of PWA directories based on the metadata of the native application;

the web scraper unable to locate the PWA in the first set of PWA directions, and in response, searching, by the web scraper, a web search based on the metadata of the native application;

providing, by the web scraper, data indicating results of the web search, including a uniform resource locator (URL) of the PWA;

identifying parameters associated with the PWA, the parameters including the URL associated with the PWA;

identifying, based on the parameters associated with the PWA, a manifest file corresponding to the URL;

parsing the manifest file to retrieve metadata of the manifest;

creating, by a management computing module at the central information handling system, a configuration file for the PWA based on the metadata;

identifying a particular application wrapper template based on an operating system for the PWA;

injecting the configuration file into the application wrapper template;

creating an installation package including the injected application wrapper template;

code-signing the installation package with a certificate;

creating an application policy based on the installation package;

pushing, by the management computing module at the central information handling system, the application policy to a client information handling system in communication with the central information handling system over a network; and a client information handling system comprising a processor having access to memory media storing instructions executable by the processor to perform operations, comprising:

applying the application policy at the client information handling system, including the injected wrapper template associated with the PWA updating notification settings at a taskbar interface at the client information handling system.

7. The computing environment of claim 6, wherein the parameters associated with the PWA include a platform and the operating system.

8. The computing environment of claim 6, wherein the metadata of the manifest includes application name, version, description, and icon associated with the PWA.

9. The computing environment of claim 6, the operations further including uploading the installation package to a data store.

10. The computing environment of claim 9, the operations further including updating an application catalog listing based on the installation package.

11. A non-transitory computer-readable medium storing software comprising instructions executable by one or more computers which, upon such execution, cause the one or more computers to perform operations comprising:

providing a request for a progressive web application (PWA) to a web scrapper, the request including metadata of a native application associated with the PWA;

searching, by the web scraper, a first set of PWA directories based on the metadata of the native application;

the web scraper unable to locate the PWA in the first set of PWA directions, and in response, searching, by the web scraper, a web search based on the metadata of the native application;

providing, by the web scraper, data indicating results of the web search, including a uniform resource locator (URL) of the PWA;

identifying parameters associated with the PWA, the parameters including the URL associated with the PWA;

identifying, based on the parameters associated with the PWA, a manifest file corresponding to the URL;

parsing the manifest file to retrieve metadata of the manifest;

creating, by a management computing module at a central information handling system, a configuration file for the PWA based on the metadata;

identifying a particular application wrapper template based on an operating system for the PWA;

injecting the configuration file into the application wrapper template;

creating an installation package including the injected application wrapper template; and code-signing the installation package with a certificate creating an application policy based on the installation package;

pushing, by the management computing module at the central information handling system, the application policy to a client information handling system in communication with the central information handling system over a network; and applying the application policy at the client information handling system, including the injected wrapper template associated with the PWA updating notification settings at a taskbar interface at the client information handling system.

12. The non-transitory computer-readable medium of claim 11, wherein the parameters associated with the PWA include a platform and the operating system.

13. The non-transitory computer-readable medium of claim 11, wherein the metadata of the manifest includes application name, version, description, and icon associated with the PWA.

14. The non-transitory computer-readable medium of claim 11, the operations further including uploading the installation package to a data store.

15. The non-transitory computer-readable medium of claim 14, the operations further including updating an application catalog listing based on the installation package.

* * * * *